United States Patent [19]
Omata et al.

[11] Patent Number: 5,738,710
[45] Date of Patent: Apr. 14, 1998

[54] CONTROL METHOD AND APPARATUS FOR MATERIAL ADSORBED ON ADSORBENT, AND SOLVENT RECOVERING METHOD AND APPARATUS USING SAME

[75] Inventors: Kazuo Omata, Iruma; Katsumi Shibata, Hasuda; Yukio Shirai, Tokyo, all of Japan

[73] Assignee: Morikawa Industries Corporation, Kohshoku, Japan

[21] Appl. No.: 645,447

[22] Filed: May 13, 1996

Related U.S. Application Data

[60] Provisional application No. 60/007,669, Nov. 28, 1995.

[30] Foreign Application Priority Data

Aug. 8, 1995 [JP] Japan ................................ 7-202278

[51] Int. Cl.$^6$ ................................................. B01D 53/06
[52] U.S. Cl. ......................... 95/107; 95/41; 95/113; 95/143; 95/270
[58] Field of Search ............................. 95/41, 90, 107, 95/113, 115, 141, 143, 270, 271; 96/108, 122–128, 130, 134, 140–146, 154; 55/267, 269

[56] References Cited

U.S. PATENT DOCUMENTS

| | | | |
|---|---|---|---|
| 1,393,335 | 10/1921 | Baldwin | 95/107 X |
| 1,535,819 | 4/1925 | Emmet | 55/269 |
| 1,899,988 | 3/1933 | Ruemelin | 55/267 X |
| 2,187,066 | 1/1940 | Youker | 55/267 X |
| 2,970,669 | 2/1961 | Bergson | 55/269 X |
| 3,220,167 | 11/1965 | Van der Ster et al. | 55/269 X |
| 4,234,326 | 11/1980 | Bailey et al. | 96/154 |
| 4,242,110 | 12/1980 | Hynes | 55/269 |
| 4,292,055 | 9/1981 | De Castella et al. | 96/125 X |
| 4,478,608 | 10/1984 | Dörling et al. | 95/271 X |
| 4,595,575 | 6/1986 | Oeste et al. | 96/144 X |
| 5,120,331 | 6/1992 | Landy | 95/90 |
| 5,248,323 | 9/1993 | Stevenson | 95/90 |

FOREIGN PATENT DOCUMENTS

| 1043429 | 9/1983 | U.S.S.R. | 96/108 |
|---|---|---|---|

*Primary Examiner*—Robert Spitzer
*Attorney, Agent, or Firm*—Price, Heneveld, Cooper, Dewitt & Litton

[57] ABSTRACT

The invention provides a method and apparatus for recovering a target material including using an adsorbent such as activated charcoal, the target material recovered in a continuous manner, as well as a method and an apparatus for recovering a solvent based on such a method and apparatus. The adsorbent for the target material is rotated to move the adsorbed material in direction of centrifugal force while the target material is attracted to the adsorbent. The excess target material is detached from a peripheral edge of the adsorbent by centrifugal force. The detached material is recovered by a recovery device provided in corresponding relation to the adsorbent.

9 Claims, 3 Drawing Sheets

- ■ ROTATING TEST 41
- ◆ ROTATING TEST 42
- ▲ ROTATING TEST 43
- □ LEFT TO STAND IN OPEN AIR 44
- ◇ LEFT TO STAND IN OPEN AIR 45
- △ LEFT TO STAND IN OPEN AIR 46

CONTROL METHOD AND APPARATUS FOR MATERIAL ADSORBED ON ADSORBENT, AND SOLVENT RECOVERING METHOD AND APPARATUS USING SAME

RELATED APPLICATIONS

This application claims the benefit of U.S. Provisional Application No. 60/007,669, filed Nov. 28, 1995.

BACKGROUND OF THE INVENTION

The present invention relates to a method and apparatus for controlling adsorption of a material in an adsorbent, which are employed to recover a solvent or the like using an adsorbent such as activated charcoal. The present invention also relates to a method and apparatus for recovering a solvent using the above control method and apparatus.

In cleaning tanks or the like conventional in various industries, gases of solvents are usually exhausted to the atmosphere and exhaust gases are typically recovered by using, for example, activated charcoal. Gases of solvents may contain mists of the solvents. The present invention is equally applicable to not only pure gas, but also gas containing mist.

In a conventional method, the activated charcoal is cooled to adsorb the gas, and after the gas is completely adsorbed, adsorption is stopped and the gas is desorbed by applying steam to the activated charcoal, or as an alternative, the desorption is made by applying heated air. Therefore, the recovery work is necessarily carried out in batches and, as a result, the working efficiency is not necessarily increased.

The present invention was developed in an effort to solve the problem mentioned above, and its object is to improve a method of adsorbing and recovering a target material using an adsorbent, and to provide a method and apparatus for controlling adsorption of the material on an adsorbent which can perform the recovery work continuously, as well as a method and apparatus for recovering a solvent based on the above control method and apparatus.

SUMMARY OF THE INVENTION

To achieve the above object, the present invention provides a control method for a material adsorbed on an adsorbent, the method having features below. According to one feature, in the control method for a material adsorbed on an adsorbent, an adsorbent adsorbing a target material is rotated to move the adsorbed material in the direction of centrifugal force while the adsorbed material is being attracted by the adsorbent.

According to another form of the method, the adsorbed material moved centrifugally in the direction of centrifugal force is detached from a peripheral edge of the adsorbent by the centrifugal force.

According to still another form of the method, the adsorbed material detached from the adsorbent is recovered by a recovery device surrounding the adsorbent.

According to still another form of the method, the adsorbent is activated charcoal.

According to still another form of the method, the adsorbed material is gaseous solvent.

According to still another form of the method, the recovery device is a device for recovering the adsorbed material by cooling the same.

To achieve the above object, the present invention also provides an apparatus for a material controlling the adsorption of an adsorbent, the apparatus having features below. According to one aspect of the invention, the apparatus comprises a rotary shaft coupled to a drive unit; a holder provided on the rotary shaft for holding an adsorbent; and the adsorbent held by the holder.

According to another aspect of the invention, the control apparatus included, a recovery device for the adsorbed material which is provided in corresponding relation to the adsorbent held by the holder.

According to still another aspect of the invention the recovery device is a device for recovering the adsorbed material by cooling the same.

According to still another aspect of the invention, the adsorbent is activated charcoal.

According to yet another aspect of the invention, the adsorbed material is gas of a solvent.

To achieve the above object, the present invention further provides a solvent recovery apparatus for a material adsorbed on the adsorbent, the method having features below.

According to one feature, the solvent recovery method comprises the steps of rotating an adsorbent adsorbing a gaseous solvent, moving the solvent gas in direction of centrifugal force while the solvent gas is being attracted by the adsorbent, causing the solvent gas to depart from a peripheral edge of the adsorbent by the centrifugal force, and recovering the solvent gas by a recovery device provided in corresponding relation to the adsorbent.

According to another aspect of the invention, the adsorbent is activated charcoal.

According to yet another aspect of the invention, the recovery device is a coding device.

According to still another feature, in the solvent recovery method, the solvent gas is the remainder after recovering the same by cooling in a previous step.

To achieve the above object, the present invention further provides a solvent recovery apparatus having features below. According to one feature, the solvent recovery apparatus comprises a rotary shaft coupled to a drive unit; a holder provided on the rotary shaft for holding an adsorbent; and a recovery device provided in corresponding circumferential relation to the adsorbent.

According to still another feature, of the solvent recovery apparatus, the recovery device is a device for recovering the solvent gas by cooling the same.

According to still another feature, of the solvent recovery apparatus, the recovery device includes, in an upstream stage, a main recovery device for recovering the solvent gas by cooling the same.

According to still another feature, in the solvent recovery apparatus, the adsorbent is activated charcoal.

BRIEF DESCRIPTION OF THE INVENTION

DETAILED DESCRIPTION OF THE PREFERRED EMBODIMENT

Figure 1:
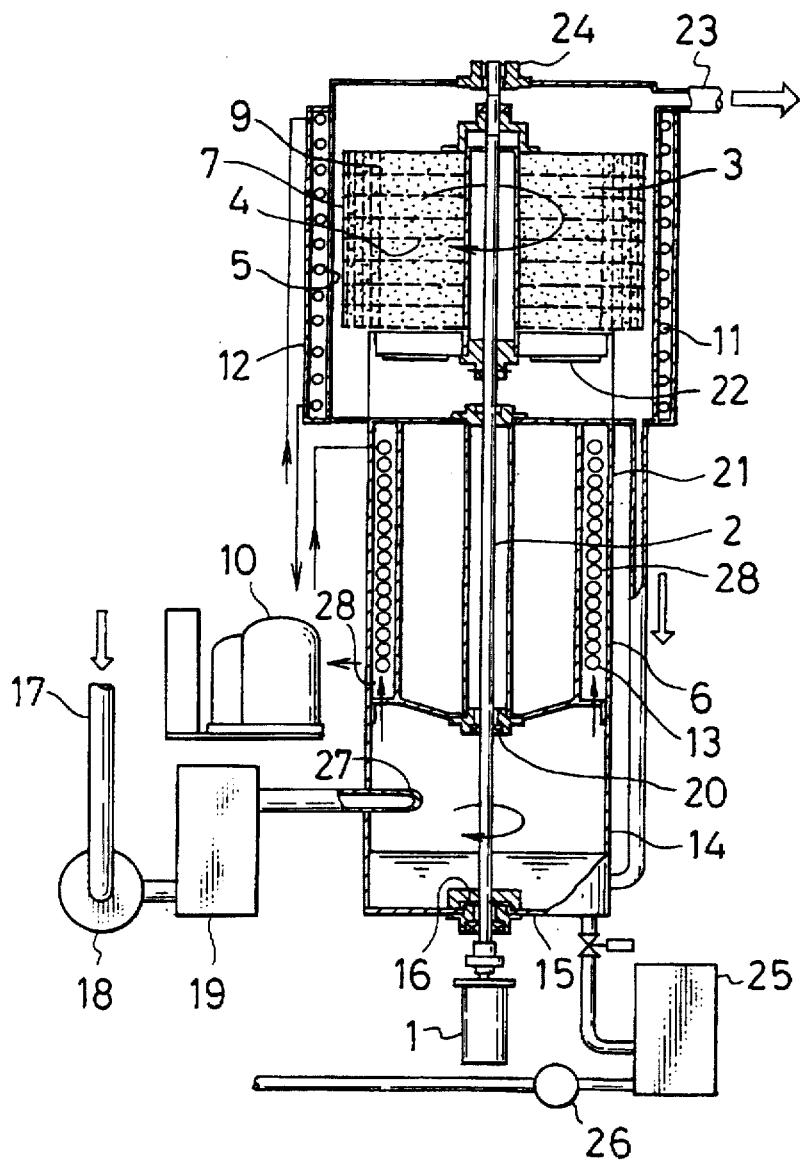
FIG. 1 illustrates a schematic form, a solvent recovery apparatus, embodying the present invention.
Figure 2:
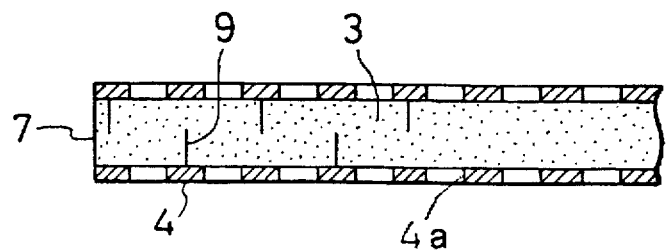
FIG. 2 is an enlarged view of part of the apparatus shown in FIG. 1.

In FIG. 1, denoted by reference numeral 1 is a drive unit comprising a motor. A rotary shaft 2 is coupled to the drive unit 1. A holder 4 for an adsorbent material 3 is provided on the rotary shaft 2. As shown in FIG. 2, by way of example, a number of tapered needles 9 are fixed to each of two opposing punched metal plates 4. The adsorbent material 3 is made of activated charcoal in the form of, e.g., an activated charcoal fiber cloth. While the cloth may be either woven or unwoven, it is preferably felt or unwoven. A felt cloth is highly air permeable and hence effective in promoting adsorption.

The activated charcoal fiber cloth 3 is attached to the metal plates 4 by being stuck to the needles 9. This arrangement enables the activated charcoal fiber cloth 3 to be positively held in place or removed therefrom with a simple structure. Incidentally, the uppermost metal plate 4 of the holder is not punched and has no holes so that effective adsorption is ensured as a whole.

Denoted by reference numeral 5 is a recovery device. In the illustrated embodiment, the recovery device 5 is provided by an inner wall surface of a housing 12 around which a tube 11 communicating with a refrigerator 10 is coiled.

Denoted by reference numeral 6 is a main recovery device disposed upstream of the recovery device 5 for recovering gas by cooling. A tube 13 communicating with the refrigerator 10 is coiled around the main recovery device 6.

Further, denoted by numeral 14 is a recovery tank having a bottom 15 to which the drive unit 1 is provided through a mechanical seal 16. A supply port in fluid communication at one end with a cleaning machine (not shown) has opposite end in fluid communication with the recovery tank 14. It is preferred that inlet 27 enter recovery tank 14 tangentially after passing through a blower 18 and a gas drier 19. As mentioned above, the main recovery device 6 comprises a coiled tube communicating with the refrigerator 10. 20 is a bearing provided at the bottom of a lower housing 21.

A suction device 22 is provided on rotary shaft 2 or fan in the form of a propeller or fan. With the rotation of shaft 2, gas to be recovered travels upwardly through perforations in lower housing 21 and is further drawn by fan 22 into housing 12 for supply to the adsorbent material 3. As mentioned above, adsorbent material 3 comprises a cloth of activated charcoal held by the holder 4.

The gas within housing 12 is forced into cloth 3 of activated charcoal through the perforations 4a formed in each of the punched metal plates 4 to be adsorbed by adsorbent 3. A clean gas exhaust port 23 and a bearing 24 are provided at the top of the housing 12. An oil/water separator 25 for separating oil and water using differences in specific gravity is located between part 23 and bearing 24 below the recovery tank 14 communicating therebetween. A pump 26 delivers the recovered solvent to a cleaning machine (not shown), by way of example. The gaseous solvent supplied by the cleaning machine (not shown) or the like is drawn by blower 18 through supply port 17, dried by gas dryer 19, and introduced to lower housing 21 through inlet port 27. The gas in housing 6 rises up through a recovery passage 28 containing coils 13 while swirling therein. During this upward movement, the gas contacts coiled tube 13 of main recovery device 6 and is condensed to a liquid, and the solvent is recovered by the main recovery device 6. The remaining uncondensed gas further rises up through passage 28 and is forced by rotating fan 22 to the lower side of holder 4 and adsorbent material 3 comprising activated charcoal. In the illustrated embodiment, the adsorbent material 3 is rotated by drive unit 1 at a high speed, e.g., 2100 rpm, so that the gaseous solvent adsorbed by the adsorbent material 3 travels outwardly under centrifugal force over the surface of material adsorbent 3. Eventually, the centrifugal force the gaseous solvent out from the peripheral edge 7 of adsorbent 3. The detached gas is cooled by recovery device 5 and condensed to a liquid on a wall surface of housing 12. As the condensate droplets grow, they run down the wall surface recovery tank 14.

In general, when mixed gases are separated from each other under centrifugal force, apparatus components such as the drive unit, bearings and rotary members must be specially designed because of the necessity of rotating the rotary members at an ultrahigh speed, making it unavoidable to push up the apparatus cost. By contrast, according to the present invention, because centrifugal force is applied to the adsorbent adsorbing a target material, mixed gases can be separated from each other and recovered at rotational speeds of ordinary motors, i.e., in the range of 1200 rpm to 2100 rpm, as seen from results listed up in Table 2 below. In addition, such a recovery process can be perform ed continuously.

The following tests were carried out for demonstrating the apparatus of the present invention.

A first purpose of the tests was to examine the effect of centrifugal force an activated charcoal used as one example of the adsorbent, wetting the activated charcoal with a solvent, and then comparing the case where the activated charcoal was not rotated, but left to stand using natural evaporation at the room temperature and the case where the activated charcoal was subjected to centrifugal force, to thereby determine a difference in desorption between both the cases. Test samples were formed as follows.

Figure 3:
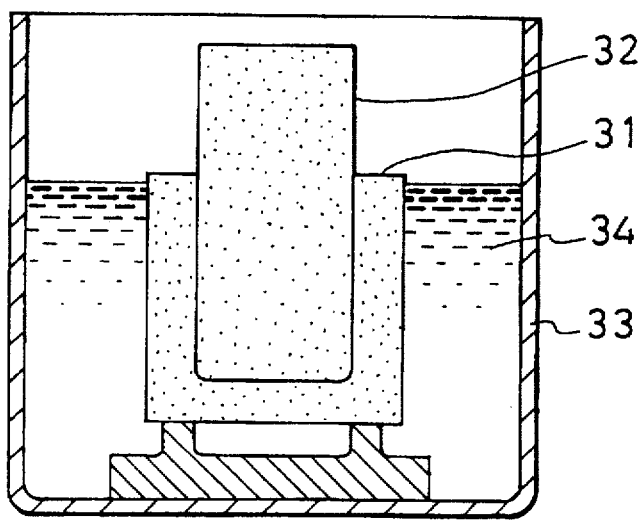
FIG. 3 is a view showing the process of fabricating a sample for the test of controlling adsorption of a target material on an adsorbent under centrifugal force, the sample being used to demonstrate one embodiment of the present invention.

Referring to FIG. 3, container 31 made of a sintered metal in which a cloth of activated charcoal 32 is placed and held. A container 33 trichloroethane 34 as a solvent therein. The trichloroethane 34 permeated through the sintered container 31 into the cloth of activated charcoal 32 so that the activated charcoal was wetted with trichloroethane. Sintered container 31 was taken out of container 33 to become a test sample after being left to stand as it was. The reason why the sintered container 31 was left to stand as it was resided in allowing the solvent adsorbed in liquid phase to evaporate and enabling the effect of centrifugal force to be measured on the solvent adsorbed in gas phase. A large number of samples were prepared to determine differences in the desorption rate of the solvent between the two cases. Specifically, for each of the samples, the amount by which the solvent was evaporated naturally over time in open air was first measured, and the amount by which the solvent was evaporated over time under centrifugal force was then measured.

Figure 4:
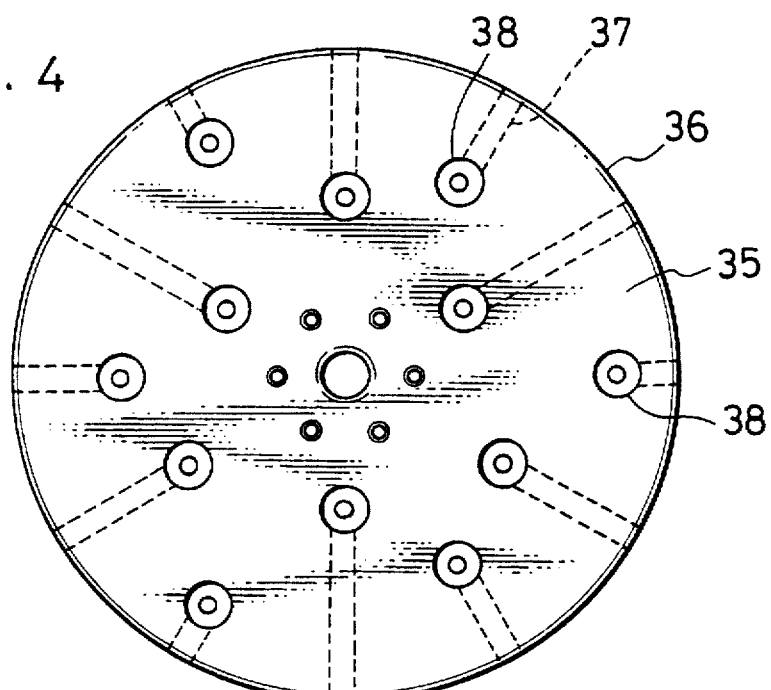
FIG. 4 is a plan view of apparatus of a test apparatus for accommodating and rotating the sample shown in FIG. 3.
Figure 5:
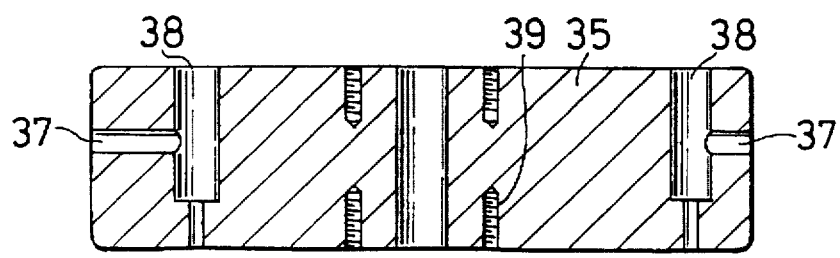
FIG. 5 is a cross-sectional view of the members shown in FIG. 4.

An apparatus for applying the centrifugal force is constructed as shown in FIGS. 4 and 5. A plate-shaped jig 35 has formed therein a plurality of blind bores 38 and passages 37 extending from the blind bores 38 to an outer peripheral wall 36 of the jig. A test sample was placed in each of the blind bores 38 and the apparatus was rotated by a drive unit (not shown). Incidentally, 39 denotes a coupling portion to the drive unit (not shown).

Figure 6:
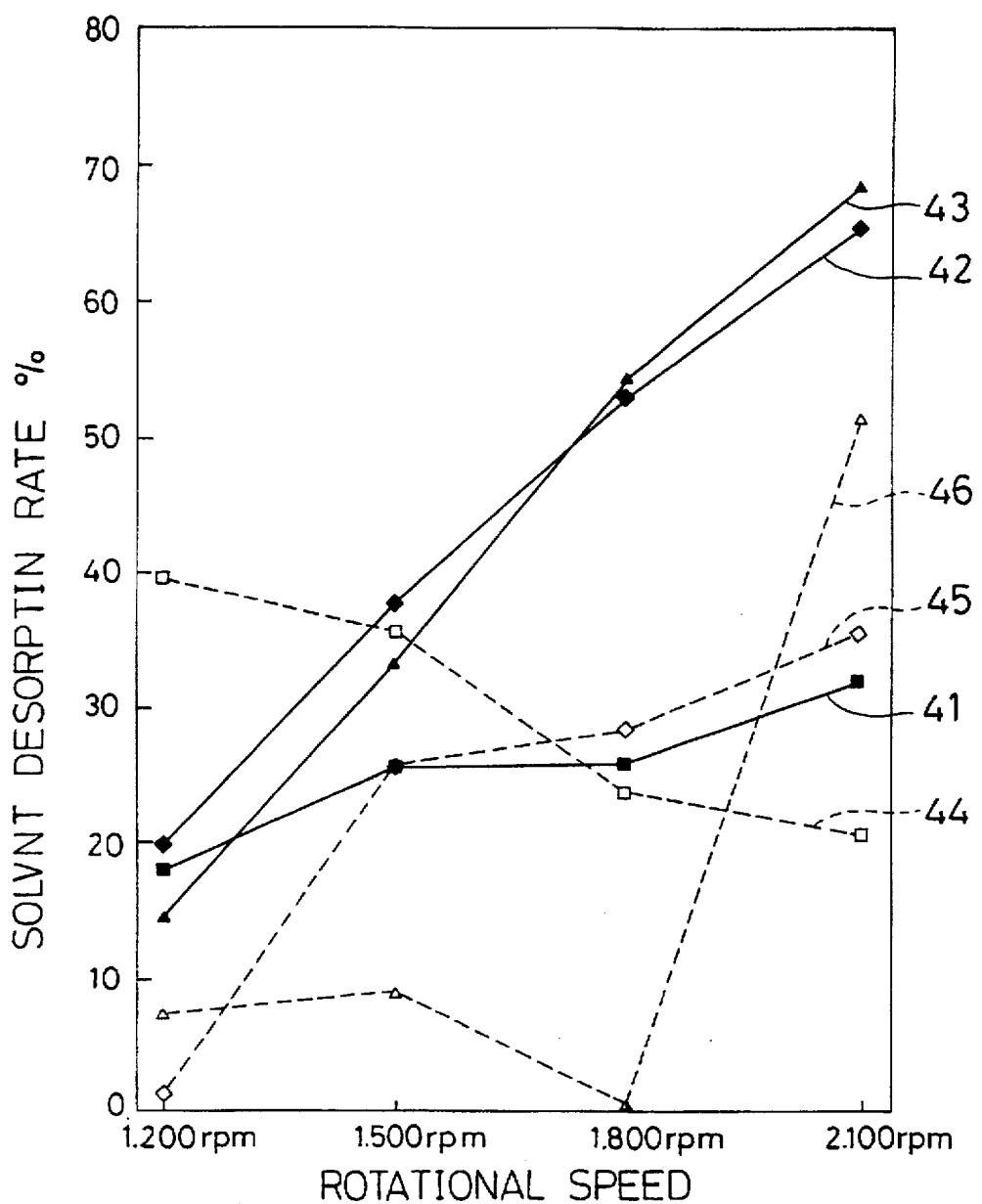
FIG. 6 is a graph showing results of desorption tests on solvents to which the present invention is applicable.

As seen from FIG. 6, results of the tests showing desorption rates of the solvent under the centrifugal force proved that the desorption rate was increased proportionally to the rotational speed for each of samples 41, 42 and 43 subjected to the rotating test.

The graph also shows, for comparison purposes, the amount of the solvent evaporated from each reference sample 44, 45 and 46 to stand in open air measured at intervals of five minutes. Of the three reference samples, only sample 44 showed an increase in its weight over time. This result was presumably caused by absorption of moisture in the rainy season, and hence can be regarded as an exception.

It will be understood from the results plotted in the graph of FIG. 6 that the centrifugal force applied to the adsorbent, i.e., the activated charcoal, by rotating the same is apparently more effective in desorbing the solvent than the case of leaving the adsorbent to stand as it is.

Similar tests as described above were carried out on the many prepared samples. Test results are shown in Table 1 and Table 2 below. In these Tables, rotated represents the sample that was rotated to exert centrifugal force on it, and "left to stand" represents the sample that was left to stand as it was for the same period of time as the rotated sample.

From the test results, it is evident that the solvent samples subjected to the centrifugal force were desorbed more efficiently than the solvent in the samples simply left to stand.

TABLE 1

| Test sample | A | B | C |
| --- | --- | --- | --- |
| Rotated A1 | 19.77159 | 19.78060 | 0.00901 |
| Rotated A2 | 19.64069 | 19.64578 | 0.00509 |
| Rotated A3 | 19.50434 | 19.50740 | 0.00306 |
| Left to stand D1 | 19.91731 | 19.92310 | 0.00579 |
| Rotated B1 | 19.64181 | 19.64690 | 0.00509 |
| Rotated B2 | 19.52865 | 19.53172 | 0.00307 |
| Rotated B3 | 19.80994 | 19.81374 | 0.00380 |
| Left to stand D2 | 19.83207 | 19.83694 | 0.00487 |
| Rotated C1 | 19.71769 | 19.71987 | 0.00218 |
| Rotated C2 | 19.43921 | 19.44298 | 0.00377 |
| Rotated C3 | 19.67595 | 19.67895 | 0.00300 |
| Left to stand D3 | 19.78625 | 19.78971 | 0.00346 |

A: Weight before adsorption (g)
B: Weight just after adsorption (g)
C: Weight of adsorbed solvent just after adsorption (g)

TABLE 2

| | Solvent desorption rate after rotation for 5 minutes (%) | | | |
| --- | --- | --- | --- | --- |
| Test Sample | 20 Hz 1,200 rpm | 25 Hz 1,500 rpm | 30 Hz 1,800 rpm | 35 Hz 2,100 rpm |
| Rotated A1 | 30.2 | 45.1 | 51.8 | 58.6 |
| Rotated A2 | 11.0 | 17.5 | 15.7 | 18.9 |
| Rotated A3 | 12.7 | 13.7 | 9.5 | 17.6 |
| Rotated average | 18.0 | 25.4 | 25.7 | 31.7 |
| Left to stand D1 | 39.6 | 35.6 | 23.5 | 20.2 |
| Rotated B1 | 18.9 | 37.9 | 54.2 | 71.9 |
| Rotated B2 | 18.6 | 33.2 | 44.0 | 51.1 |
| Rotated B3 | 21.8 | 41.8 | 60.5 | 72.6 |
| Rotated average | 19.8 | 37.7 | 52.9 | 65.2 |
| Left to stand D2 | 1.6 | 25.7 | 28.1 | 35.3 |
| Rotated C1 | 23.4 | 57.3 | 89.4 | 100.5 |
| Rotated C2 | 2.7 | 8.5 | 18.3 | 33.4 |
| Rotated C3 | 18.0 | 34.0 | 55.0 | 71.3 |
| Rotated average | 14.7 | 33.3 | 54.3 | 68.4 |
| Left to stand D3 | 7.5 | 9.0 | 0.6 | 51.4 |

The present invention described above offers advantages below. The invention provides a basic method for adsorbing and desorbing a target material on and from an adsorbent in a continuous manner. According to the invention, the target material is continuously adsorbed and desorbed on and from the adsorbent in practice. According to the invention, the adsorbed material is continuously recovered by the adsorbent. According to the invention, the adsorbed material is continuously recovered using activated charcoal. According to the invention, the adsorbed material is gas of a solvent and is continuously recovered by cooling and condensing the gas to a liquid.

The invention offers a basic apparatus for recovering a material adsorbed on an adsorbent in a continuous manner under centrifugal force.

According to the invention there is provided an apparatus for continuously recovering the adsorbed material by using the adsorbent.

According to the invention, there can be provided an apparatus capable of controlling the adsorbed material by using a cooling device in combination with the adsorbent. According to an apparatus, activated charcoal is used as the adsorbent, and the material adsorbed on the adsorbent can be controlled so as to move toward a peripheral edge of the adsorbent for recovery. According to the invention, there is provided an apparatus for continuously recovering a solvent from a gas thereof.

The invention offers a method of recovering a solvent from a gas of the solvent in a continuous manner by using an adsorbent. According to a method of the invention, the solvent is continuously recovered from the solvent gas using activated charcoal. According to another form of the invention solvent gas, concentrated under centrifugal force is efficiently recovered by cooling. The solvent gas is cooled beforehand in a previous step and, therefore, recovery of the solvent by cooling under the centrifugal force is efficiently performed.

The invention offers an apparatus for recovering a solvent from a gas of the solvent in a continuous manner by using an adsorbent.

In the apparatus of the invention, adsorbed material has a higher density nearer a peripheral edge of the adsorbent and, therefore, is efficiently released from the peripheral edge for effective recovery.

The solvent gas to be recovered by cooling has been subjected to cooling for main recovery in a previous step and, therefore, it can be cooled further and recovered more efficiently. The solvent can continuously be recovered by using activated charcoal.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A method for controlling adsorption of a target material on an adsorbent, comprising the steps of:

rotating an adsorbent about an axis;

introducing the target material to the adsorbent;

passing the target material through the adsorbent in a direction of centrifugal force produced by rotating the adsorbent such that said target material is being attracted by the adsorbent; and condensing the target material to a liquid phase by cooling after the target material has passed through the adsorbent, the cooling achieved by substantially enclosing the adsorbent in a recovery device cooled by refrigeration.

2. The method according to claim 1, further including spinning the target material moving in the direction of centrifugal force from a peripheral edge of the adsorbent by the centrifugal force.

3. The method according to claim 2, further including condensing a portion of the target material to a liquid prior to introducing the target material to the adsorbent.

4. The method according to claim 3, further including providing activated charcoal as the adsorbent.

5. The method according to claim 3, wherein the step of introducing the target material includes providing a gas of a solvent to be recovered.

6. A method for recovering a solvent, comprising the steps of:

producing a centrifugal force in an adsorbent material for adsorbing a gas of a solvent;

moving the gas through the adsorbent material in a direction of the centrifugal force to expose the gas to the adsorbent material;

throwing the excess gas from a peripheral edge of the adsorbent material by the centrifugal force;

condensing the gas thrown from the adsorbent material to a liquid on a refrigerated chamber wall concentrically surrounding the adsorbent material; and recovering the condensed liquid in a recovery tank.

7. The method as defined in claim 6, further including providing activated charcoal as the adsorbent.

8. The method as defined in claim 6, further including condensing the gas by cooling the same.

9. The method as defined in claim 6, further including repeating the steps of claim 6 on any gas remaining after the step of recovering the gas.

* * * * *